United States Patent Office 3,339,850
Patented Sept. 5, 1967

3,339,850
PULVERIZED POLYETHYLENE
Clifton L. Kehr, Ednor, Harry C. Helmlinger, Jr., Baltimore, and Richard W. Bush, Laurel, Md., assignors, by mesne assignments, to Allied Chemical Corporation, New York, N.Y., a corporation of New York
No Drawing. Filed Sept. 21, 1965, Ser. No. 489,062
10 Claims. (Cl. 241—23)

This invention relates to a method of preparing finely divided polyethylene. More particularly this invention is directed to the pulverization of high density polyethylene.

In order to use polyethylene resin in certain applications, e.g. flame spraying, solution casting, dip molding, rotational molding compression molding, etc.; or as thickeners, fillers, extenders etc., it is often highly desirable and sometimes required that the resin be in very finely divided form. Ordinarily, polyethylene is supplied to consumers in the form of pellets or granules. In some few instances, polyethylene is available as a so called powder which under inspection is of sandy texture and is made up of particles ranging upwards from about 200 to 500 microns in diameter.

Attempts to grind polyethylene resin to diameters smaller than about 200 microns have been generally unsuccessful since as grinding progresses, the material becomes soft and begins to stick to various parts of the grinding mill. This necessitates numerous shutdowns for cleaning operations. Furthermore, the ground particles begin to stick to each other and agglomerate, thus defeating the purpose of the grinding operation.

Numerous methods for preparing finely divided polyethylene have been proposed by the prior art. Examples of such methods include (1) dissolving the polymer in a heated solvent for the polymer, followed by cooling the solution to precipitate powdered resin or (2) grinding the polymer after it has been refrigerated. All the prior methods require very expensive procedures for accomplishing the desired size reduction.

It is an object of this invention to provide finely divided high density polyethylene having a particle size less than 50 microns in diameter. Another object is to provide a method for comminuting particulate high density polyethylene to a very fine particle size. Still other objects of the invention will become apparent after consideration of the following more detailed disclosure.

Surprisingly, we have now found that polyethylene can be mechanically pulverized to a particle size of less than 50 microns, even 10 to 30 microns if the starting polymer has a density of 0.950 or higher and is subjected to a chain scission treatment to reduce the molecular weight to the point whereat the polymer has a melt index greater than 100 prior to pulverization.

It is critical in practicing the instant invention that the polymer to be pulverized be of sufficiently low molecular weight and be sufficiently crystalline to fracture upon impact. To satisfy this requirement the starting polyethylene must be subjected to a chain scission treatment, e.g. by oxidation or thermal cracking to reduce the molecular weight to the point whereat the melt index exceeds 100. To satisfy the second requirement, the polyethylene must be linear, that is before the chain scission treatment by oxidation or thermal cracking, the polymer must have a density above 0.950.

Treating polyethylene of either high or low density to reduce the molecular weight by oxidation increases the density thereof by virtue of substituting oxygen atoms for hydrogen. However, such treatment affords no substantial change in crystallinity. Thus, for example, a low density polyethylene, i.e. 0.92 density, might be oxidized sufficiently that the density is above 0.95. However, the polymer would still not be sufficiently crystalline so as to fracture upon impact by the instant invention. The criticality of the melt index and density of the polymer to be pulverized will be shown in the examples hereinafter.

Commercially available high density linear polyethylenes have molecular weights in the range 20,000 to 2,000,000 or more, i.e. a melt index of 50–0. Such high density polyethylenes per se are inoperable in the instant invention to obtain pulverized particles of 50 microns or less in diameter. It is necessary to reduce the molecular weight by some means before the polymer is operable in the instant invention. There are various chain scission methods for reducing the molecular weight to make the polymer operable as a starting material in the instant invention. One method of reducing the molecular weight of high density polyethylene is by oxidation. The polymer can be oxidized by passing an oxygen-containing gas into an oven over a solid polyethylene therein at a temperature below the melting point of the polymer. Still another method of oxidation would be to suspend particles of polyethylene in water or an organic solvent and either bubble air through the suspension or pressurize the system with air or other oxygen-containing gas at temperatures ranging from about 105° C. up to the melting point of the polymer. Still another method would be to pass oxygen-containing gas at a temperature from 80° C. degrees up to the melting point of the polymer through a fluidized bed of polyethylene particles. A further method would include oxidizing polyethylene in the melt. In all the aforestated methods of oxidizing polyethylene, if desired, a minor amount, i.e. 0.05 to 5% by weight of the polyethylene of an organic peroxide, ozone, nitrogen tetroxide or other oxidation promoter may be blended with the polymer to eliminate the induction period and increase chain scission. Superatmospheric pressure may also be used if desired in any of the oxidation methods employed including those aforestated. Another chain scission method of reducing the molecular weight of the polyethylene herein to an operable melt index range is by visbreaking, i.e. thermal cracking.

The high density linear polyethylene operable in this invention can be produced by many methods well known in the art. For example, polyethylene having a density of 0.95–0.97 can be obtained using the Phillips catalyst system, i.e. chromium oxide on a $SiO_2$–$Al_2O_3$ support wherein at least part of the chrominum is in the hexavalent state. The polymerization is performed at temperatures of 60–260° C. See U.S. 2,825,721. Another catalyst system capable of forming the high density polyethylene used herein is disclosed in U.S. 2,816,883. Yet another catalyst system consisting essentially of vanadium oxytrichloride and ethyl aluminum dichloride will yield high density polyethylene having a melt index less than 0.01. Still another catalyst system yielding very high molecular weight polyethylene having a melt index less than 0.01 and a density of about 0.96 comprises $TiCl_3$ and diethyl aluminum chloride. A still further method of producing high density polyethylene is the Ziegler process wherein the catalyst consists essentially of compounds of metals of Group IV–B, V–B and VI–B and aluminum trialkyl compound as set out in Belgium Patent 533,362 issued to K. Ziegler. Yet another method of forming high density polyethylene operable herein is disclosed in U.S. 2,949,447. As herein before stated the high density polyethylene must undergo treatment to reduce the molecular weight to a point whereat the melt index is above 100 before it can be pulverized to a particle size of less than 50 microns.

The general procedure for carrying out the instant invention is to subject linear polyethylene having a density of 0.95 or higher to a chain scission treatment, e.g., in an oxidation or thermal cracking step in order to decrease the molecular weight to the point whereat the melt index is above 100. Following this, the low molecular weight high density linear polymer is mechanically pulverized to a particle size of less than 50 microns. The mechanism used for the pulverization step is not critical. Various mechanisms are operable and include but are not limited to hammer mills, fluid energy mills operated with compressed air and the like.

The following examples are set down to illustrated the invention and are not deemed to limit its scope. Throughout the instant invention tests were conducted as follows:

Melt indices (MI) below 100 were measured under Condition E specified in ASTMD 1238–57T. Melt indices (MI) above 100 were determined by the formula $\log MI = 0.921 \log F + 1.039$ wherein F is the flow rate measured under Condition D specified in ASTMD 1238–57T.

Densities of the polymer in g./cc. were measured under the conditions specified in ASTMD 1505–57T.

Reduced specific viscosity, i.e. RSV, was obtained by dissolving 0.1 g. of the polymer in 100 cc. decahydronaphthalene at 135° C. in accordance with the procedure of ASTMD 1601–61.

The crystalline melting point of the polymer was measured as the temperature at which birefringence disappears from the sample when viewed through crossed Nicol prisms in a hot stage microscope heated at a rate of 1° C./min.

The screen size is reported as U.S. standard screen size.

Unless otherwise noted, all parts and percentages are by weight.

Example 1

240 lbs. of commercially available linear polyethylene having a density of 0.955, a melt index of 0.0 and a reduced specific viscosity of 4.5 was oxidized in air in a ribbon blender for 46 hrs. at 120° C. The thus oxidized polymer on characterization had a melt index of 550.

The high density low molecular material was passed through a "Jet-O-Mizer" fluid energy mill, Model 0202 manufactured by Fluid Energy Processing & Equipment Co., Lansdale, Pa. along with air at ambient temperature and 120 p.s.i.g. A sample of the comminuted polyethylene particles was screened with the following analysis:

| Screen size: | Weight percent |
|---|---|
| On 100 mesh (>149 microns) | 0.3 |
| 100–200 mesh (74–149 microns) | 2.3 |
| 200–325 mesh (44–74 microns) | 6.6 |
| Thru 325 mesh (<44 microns) | 90.8 |

Example 2

240 lbs. of commercially available polyethylene having a density of 0.955, and RSV of 4.5 and a melt index of 0.0 were oxidized in a ribbon blender in oxygen for 30 hrs. at 120° C. The thus oxidized product had a melt index of 2600. The high melt index material was comminuted as in Example 1 in a "Jet-O-Mizer" with 125 p.s.i.g. and ambient temperature. A screen analysis of the resultant product is as follows:

| Screen size: | Weight percent |
|---|---|
| On 100 mesh (>149 microns) | 1.3 |
| 100–200 mesh (74–149 microns) | 4.6 |
| 200–325 mesh (44–74 microns) | 11.1 |
| Thru 325 mesh (<44 microns) | 83.0 |

Example 3

The comminuted material from Example 2 was recycled through the "Jet-O-Mizer" for one more milling with the resulting screen analysis of the twice milled material being:

| Screen size: | Weight percent |
|---|---|
| On 100 mesh (>149 microns) | 0.1 |
| 100–200 mesh (74–149 microns) | 0.6 |
| 200–325 mesh (44-74 microns) | 7.4 |
| Thru 325 mesh (<44 microns) | 91.9 |

Microscopic examinations of the material that passed through 325 mesh showed that most of the particles were between 10 and 30 microns in diameter.

Example 4

240 lbs. of commercially available linear polyethylene having a density of 0.955, an RSV of 4.5 and a melt index of 0.0 were oxidized in a ribbon blender with air at 80 lbs. pressure for 34 hrs. at 100° C. The thus treated material had a melt index of 4,800.

The high density low molecular weight material was fed to an 8" "Jet-Pulverizer" manufactured by Jet Pulverizer Co., Palmyra, N.J., along with air at ambient temperature and 300 p.s.i.g. The resultant comminuted high density polyethylene material had the following screen analysis.

| Screen size: | Weight percent |
|---|---|
| On 100 mesh (>149 microns) | 0.5 |
| 100–200 mesh (74–149 microns) | 1.9 |
| 200–325 mesh (44–74 microns) | 3.8 |
| Thru 325 mesh (<44 microns) | 93.8 |

The following examples will show the criticality of the polyethylene material having a melt index in the range of 0.95–0.97 and a melt index above 100.

Example 5

200 lbs. of commercially available polyethylene having a density of 0.925, an RSV of 0.8 and a melt index of 22 was oxidized in oxygen in a ribbon blender for 90 hrs. at 100° C. The resultant product had a melt index of 1300. The product was fed to a 8" "Jet Pulverizer" manufactured by the Jet Pulverizer Co., Palmyra, N.J., along with air at ambient temperature and 300 p.s.i.g. The thus comminuted low density polyethylene of low molecular weight had a screen analysis as follows:

| Screen size: | Weight percent |
|---|---|
| On 100 mesh (>149 microns) | 88 |
| 100–200 mesh (74–149 microns) | 8 |
| 200–325 mesh (44–74 microns) | 4 |
| Thru 325 mesh (<44 microns) | 0 |

Thus, as can be seen from the above screen analysis, even though the polymer has a melt index above 100, i.e. is of low molecular weight, it is necessary that the density of the starting polymer be above 0.95 in order to obtain particles less than 50 microns in diameter.

Example 6

200 lbs. of commercially available polyethylene having a density of 0.955, an RSV of 4.5 and a melt index of 0.0 were oxidized in air for 20 hrs. in a ribbon blender at 120° C. The thus treated product had a melt index of 77. The oxidized product was fed to a Wheeler Jet-O-Mizer fluid energy mill as employed in Example 1 along with air and ambient temperature and 120 p.s.i.g. The thus comminuted product was screened and the results are as follows:

| Screen size: | Weight percent |
|---|---|
| On 100 mesh (>149 microns) | 19 |
| 100–200 mesh (74–149 microns) | 31 |
| 200–325 mesh (44–74 microns) | 23 |
| Thru 325 mesh (<44 microns) | 27 |

In all the above examples the particle size of the starting polymer was in the range 20–100 mesh. Since in all cases the oxidation step was carried out while the polymer was maintained in the solid state, there was no change in particle size prior to the comminuting step.

The particulate high density polyethylene to be comminuted in accordance with this invention should preferably have a particle size less than about 8 mesh. In other words the largest dimension of the thermoplastic resin particles should be less than about ¼" and more preferably is less than about ⅛".

Temperature and/or pressure is not critical in the process of this invention. Obviously, the grinding step of the process should not be performed at temperatures above the melting point of the polymer. Since the process gives good to excellent results at atmospheric temperature and fluid pressures ranging from 100 to 500 p.s.i.g., such conditions are preferred.

The high density polyethylene material can be comminuted to an ultimate particle size less than 50 microns in a very short period of time by use of this process. The very finely divided polyethylene produced constitutes a useful article of commerce and can be used for example as a dispersion in water, as a fluid bed coating for metal articles, etc.

In the process of this invention the high density polyethylene particles do not become soft or molten as the result of comminution. Consequently, there is no sticking and buildup on any part of the apparatus used and no agglomeration of the resin particles results.

What is claimed is:

1. A process for comminuting particulate linear polyethylene to an average size of less than 50 microns which comprises subjecting polyethylene having a density of at least 0.950 to a chain scission treatment until the melt index of the polymer is at least 100 and thereafter comminuting the thus treated product.

2. The process according to claim 1 wherein the chain scission treatment is an oxidation step.

3. The process according to claim 1 wherein the chain scission treatment is a thermal cracking step.

4. The process according to claim 1 wherein the comminuting is carried out in a fluid energy mill.

5. The process according to claim 1 wherein the comminuting is performed in a hammer mill.

6. The process for comminuting particulate linear polyethylene so that at least 80% passes through 325 mesh screen which comprises subjecting polyethylene having a density of at least 0.950 to a chain scission treatment until its melt index is at least 100 and thereafter comminuting the thus treated product.

7. The process according to claim 6 wherein the chain scission treatment is an oxidation step.

8. The process according to claim 6 wherein the chain scission tretament is a thermal cracking step.

9. The process according to claim 1 wherein the comminuting is carried out in a fluid energy mill.

10. The process according to claim 6 wherein the comminuting is performed in a hammer mill.

References Cited

UNITED STATES PATENTS

| | | | |
|---|---|---|---|
| 2,347,464 | 4/1944 | Cuno | 241—23 |
| 2,582,327 | 1/1952 | Haine | 241—30 |
| 2,858,299 | 10/1958 | Guzzetta | 241—23 |
| 2,879,005 | 3/1959 | Jarvis | 241—23 |
| 3,115,486 | 12/1963 | Weisenberger | 241—23 |
| 3,152,201 | 10/1964 | Kumnick | 241—23 |

WILLIAM W. DYER, JR., *Primary Examiner.*

G. A. DOST, *Assistant Examiner.*